J. TASHIMA.
ALEMBIC COMBINED DISTILLING AND STERILIZING ATTACHMENT FOR KETTLES.
APPLICATION FILED APR. 27, 1921.

1,432,136. Patented Oct. 17, 1922.

INVENTOR
J. TASHIMA

BY

ATT'YS.

Patented Oct. 17, 1922.

UNITED STATES PATENT OFFICE.

JOE TASHIMA, OF SAN FRANCISCO, CALIFORNIA.

ALEMBIC COMBINED DISTILLING AND STERILIZING ATTACHMENT FOR KETTLES.

Application filed April 27, 1921. Serial No. 464,892.

*To all whom it may concern:*

Be it known that I, JOE TASHIMA, a subject of the Emperor of Japan, residing at San Francisco, in the county of San Francisco and State of California, have invented new and useful Improvements in Alembic Combined Distilling and Sterilizing Attachments for Kettles, of which the following is a specification.

The present invention relates to improvements in alembics or distilling vessels and resides in the provision of a small, compact and inexpensive device which is capable of being readily and easily attached to an ordinary cooking vessel such as a pot or kettle and which may be used for distilling of water or other materials or for sterilizing purposes or for steaming and cooking food, the device being constructed so that it may be used for either of the purposes above mentioned by a simple adjustment of one of the parts thereof.

A further object is to provide a device of the character described which, when attached to a vessel such as a pot or kettle, will be supported entirely by said pot or kettle and which need not be removed in order to provide for its use as a distilling device or as a sterilizing or steaming device, the lid or cover of the device being so constructed that when in one position it will provide for the use of the device as a still and in another position will provide a sterilizer or steamer.

A further object is to provide a device of the character described which may be taken apart and stored or packed in small compass and which may be used in connection with the ordinary kitchen stove.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings.

Figure 1:
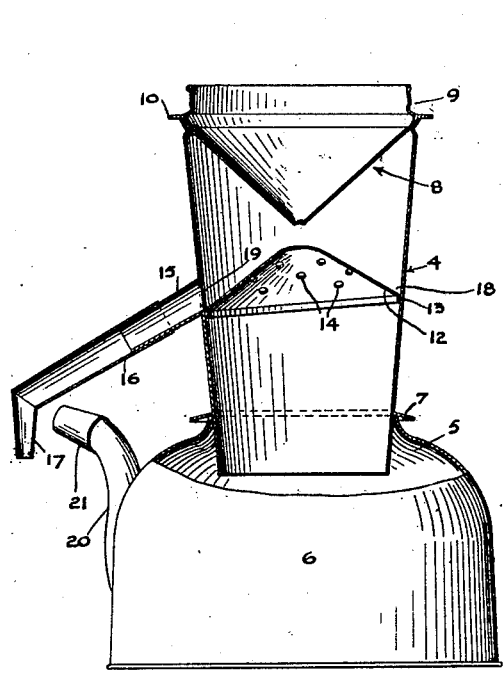
Figure 1 is a vertical sectional view of the device of the invention shown as it will appear when in use as a still and mounted upon a kettle, one wall being broken away for the sake of clearness of illustration.
Figure 2:
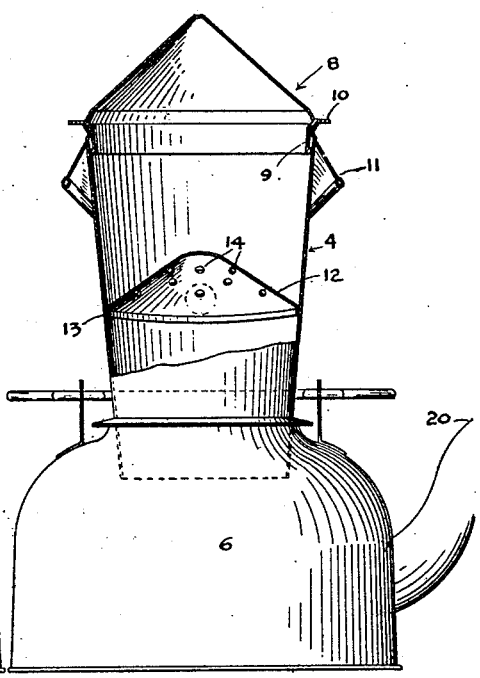
Figure 2 is a vertical sectional view partly in elevation of the device of the invention shown as it will appear when used as a sterilizer or steamer and mounted upon a kettle.
Figure 3:
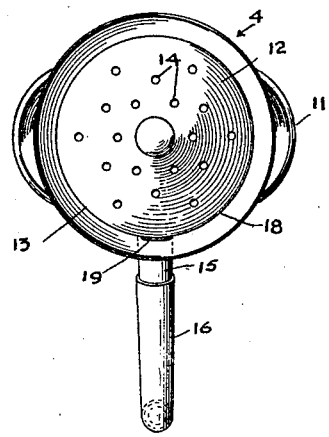
Figure 3 is a top plan view of the device with the lid or cover removed.

Referring to the embodiment of the invention illustrated in the accompanying drawings, the invention comprises a body or chamber 4, which is preferably frusto-conical in form, and made of light sheet or other metal, said body being open at both ends. The lower end of the body is of smaller diameter than the upper end and is adapted to extend into the open side 5 of and close a kettle or other cooking utensil 6. A lateral annular flange 7 is provided exteriorly upon the body 4, at a point spaced from the lower end thereof and rests upon the upper edge of the kettle 6, so as to provide a tight seal. A conical lid or cover 8 is provided for closing the upper end of the body and has a cylindrical portion 9 adjoining the base of the conical portion, which portion 9 is adapted to receive the upper end of the body in one position of the lid. At the juncture of the conical and cylindrical portions there is provided a lateral annular flange 10, which is adapted to engage the upper edge of the body 4, when the lid is inverted and the conical portion is extended into the body 4, as shown in Figure 1. Fig. 2 shows the lid in its other position. Upon the opposite sides of the body may be provided handle portions 11 of any suitable construction.

At a point intermediate the ends of and within the body is a concavo-convex partition 12 with its concave side lowermost and its outer edge soldered or otherwise secured as at 13, to the body 4. This partition is provided with a series of perforations 14 to allow the vapor and steam to pass upwardly therethrough into the upper part of the chamber or body. Extending outwardly from the side of the body 4, at a point just above the lower edge of the partition is a tubular outlet nipple 15. This nipple is inclined outwardly and downwardly and is adapted to extend into one end of a discharge spout 16, which spout telescopes the nipple, as shown in Fig. 1. The lower end of the spout is bent angularly downwardly as at 17 and is disposed to one side of the kettle so that it may be caused to discharge into a vessel or the like, not shown.

To provide for the discharge of the distilled products and moisture from the body, through the nipple 15, and spout 16, the partition 12 is mounted in the body so that the side thereof opposite the nipple 15 is higher than the side adjacent the said nipple. This provides a channel 18 which inclines towards the outlet opening 19, with which the nipple 15 connects. To prevent steam and vapors from escaping from the kettle through the spout 20 thereof, a small cap 21 is placed over the end of the spout.

To use the device as a still, for distilling water or the like, in fact for general distilling purposes, it is placed upon a kettle, as shown in Fig. 1, with the lid 8 inverted. Cold water is poured into the inverted lid and the water or other product to be distilled is placed within the kettle 6. The vapors and steam arising from the kettle 6, will pass upwardly into the body 4 and through the perforated partition 12. The steam and vapors upon encountering the conical lid or cover, which lid or cover is maintained relatively cool by the water thereon, will condense and moisture will form in drips of the conical lid and drop upon the convex side of the partition. The products of distillation will then drain in the channel 18 towards the opening 19 and through said opening, the nipple and spout 16 into a receptacle, not shown, which may be placed along side of the kettle to receive the products of distillation. By reason of the steam and vapors passing forcibly through the small perforations 14 the products of distillation will be prevented from dropping through said perforations in any appreciable amount and will drain into the channel 18 and from thence through the discharge opening 19.

It will thus be seen I have provided a very simple, compact and easily operable still which may be used in connection with an ordinary kettle on a kitchen stove, for the purpose of distilling water or for general distilling purposes. The device is small and such that it may be cheaply manufactured and sold, and when not in use may be removed from the kettle and hung upon the wall in the manner of the ordinary kitchen utensil.

For sterilizing or steaming purposes the lid or cover is placed upon the body, as shown in Fig. 2, and the objects to be sterilized or steamed are placed within the upper part of the body upon the partition 12. The placing of the lid with the conical portion uppermost provides ample space for reception of articles or materials to be sterilized or steamed. Steam from the kettle will pass upwardly into the lower side of the body 4 and through the perforations 14 so as to come into contact with the objects to be sterilized or steamed. The steam will escape through the opening 19 and nipple 15. The spout 16 may be removed, if desired, when the device is used as a steamer or sterilizer.

I claim:

1. A device of the character described, comprising a hollow body open at both ends and having one end adapted to extend into and close the upper side of a kettle or like receptacle, a perforated partition within the body intermediate the ends thereof, said body having an outlet opening above said partition and a closure or cap removably mounted upon and closing the upper end of said body, said cap being in conical form and adapted to be mounted so that the conical portion extends into the body or upwardly from the upper end of the body, depending upon the use to which the device is to be put.

2. A device of the character described comprising a hollow body open at both ends, a flange on the outer wall of the body adjacent one end thereof, which flange is adapted to engage the upper side of a kettle or the like in which one end of the body is extended, a perforated partition within said body intermediate the ends thereof, said body having an outlet opening above said partition and a hollow cap for closing the upper end of the body, which cap is adapted to be mounted so as to extend into the body so as to contain water or to be mounted so as to extend above the upper end of said body.

3. A device of the character described comprising a hollow body open at both ends, a flange on the outer wall of the body adjacent one end thereof, which flange is adapted to engage the upper side of a kettle or the like in which one end of the body is extended, a perforated partition within said body intermediate the ends thereof, said body having an outlet opening above said partition and a hollow cap for closing the upper end of the body, which cap is adapted to be mounted so as to extend into the body so as to contain water or to be mounted so as to extend above the upper end of said body, said partition being inclined to provide for drainage into said opening.

4. A device of the character described comprising a hollow body open at both ends, a flange on the outer wall of the body adjacent one end thereof, which flange is adapted to engage the upper side of a kettle or the like in which one end of the body is extended, a perforated partition within said body intermediate the ends thereof, said body having an outlet opening above said partition and a hollow cap for closing the upper end of the body, which cap is adapted to be mounted so as to extend into the body, so as to contain water or to be mounted so as to extend above the upper end of said body, said partition being concavo-convex and inclined so as to provide for drainage towards said opening.

JOE TASHIMA.